(12) United States Patent
David

(10) Patent No.: US 11,066,109 B1
(45) Date of Patent: Jul. 20, 2021

(54) TIRE PROTECTION SYSTEM

(71) Applicant: Anthony David, Crowley, TX (US)

(72) Inventor: Anthony David, Crowley, TX (US)

( * ) Notice: Subject to any disclaimer, the term of this patent is extended or adjusted under 35 U.S.C. 154(b) by 0 days.

(21) Appl. No.: 16/273,895

(22) Filed: Feb. 12, 2019

Related U.S. Application Data

(60) Provisional application No. 62/629,887, filed on Feb. 13, 2018.

(51) Int. Cl.
*B62D 25/18* (2006.01)

(52) U.S. Cl.
CPC ................................. *B62D 25/18* (2013.01)

(58) Field of Classification Search
CPC ...... B62D 25/18; B62D 25/16; B62D 25/182; B62D 25/184; B62D 25/186; B62D 25/188
See application file for complete search history.

(56) References Cited

U.S. PATENT DOCUMENTS

| | | | | |
|---|---|---|---|---|
| 1,178,680 A * | 4/1916 | Rosenthal | ............... | B60R 19/54 280/160 |
| 1,726,158 A * | 8/1929 | Masury | ..................... | B60S 1/68 280/160 |
| 1,759,687 A * | 5/1930 | Carter | ..................... | B60R 19/54 209/215 |
| 1,805,933 A * | 5/1931 | Victor | ..................... | B60R 19/54 280/160 |
| 3,956,111 A * | 5/1976 | Manfredi | .................. | B03C 1/06 209/215 |
| 4,205,861 A * | 6/1980 | Roberts | ................ | B62D 25/168 280/851 |
| 4,903,856 A * | 2/1990 | Watts | ....................... | B62J 99/00 280/160 |
| 5,326,135 A * | 7/1994 | Nakayama | ............. | B62D 25/16 280/850 |
| 5,582,430 A * | 12/1996 | Bauer | .................. | B62D 25/188 280/847 |
| 8,408,601 B1 * | 4/2013 | Miranda | ................ | B62D 25/18 280/847 |
| 9,598,117 B1 * | 3/2017 | Hilburn | .................. | B60R 16/02 |
| 9,751,482 B1 * | 9/2017 | Brew | ..................... | B60R 19/54 |
| 10,829,161 B1 * | 11/2020 | Vu | ......................... | B62D 25/18 |
| 10,933,921 B1 * | 3/2021 | Jacobson | ............. | B62D 25/188 |

* cited by examiner

*Primary Examiner* — James M Dolak

(57) ABSTRACT

A tire protection system includes a magnet assembly disposed in front of or behind a tire of a vehicle. The magnet assembly attracts and collects metallic debris on the roadway in front of the tire as the vehicle travels along the roadway, thereby preventing the debris from damaging the tire. The magnet assembly may be integrated into a wire-type housing and/or frame that is coupled to a mud flap, lower windscreen, and/or body-side molding located near the undercarriage of the vehicle.

1 Claim, 3 Drawing Sheets

TIRE PROTECTION SYSTEM

This application claims priority to U.S. Provisional Application No. 62/629,887 filed 13 Feb. 2019 titled "Tire Protection System."

BACKGROUND

1. Field of the Invention

The present application relates generally to systems for protecting tires from debris, particularly from metallic debris.

2. Description of Related Art

There are many different types of vehicles for cleaning metallic debris from streets and roadways. These "street cleaners" are typically large commercial trucks designed specifically for the purpose of removing debris from roadways.

In addition, there are a variety of wheeled magnetic devices for picking up metallic debris, such as wheeled magnet strips for picking up nails at construction sites. However, these devices provide no protection for passenger vehicles.

Although great strides have been made in the area of vehicles for cleaning debris from roadways, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
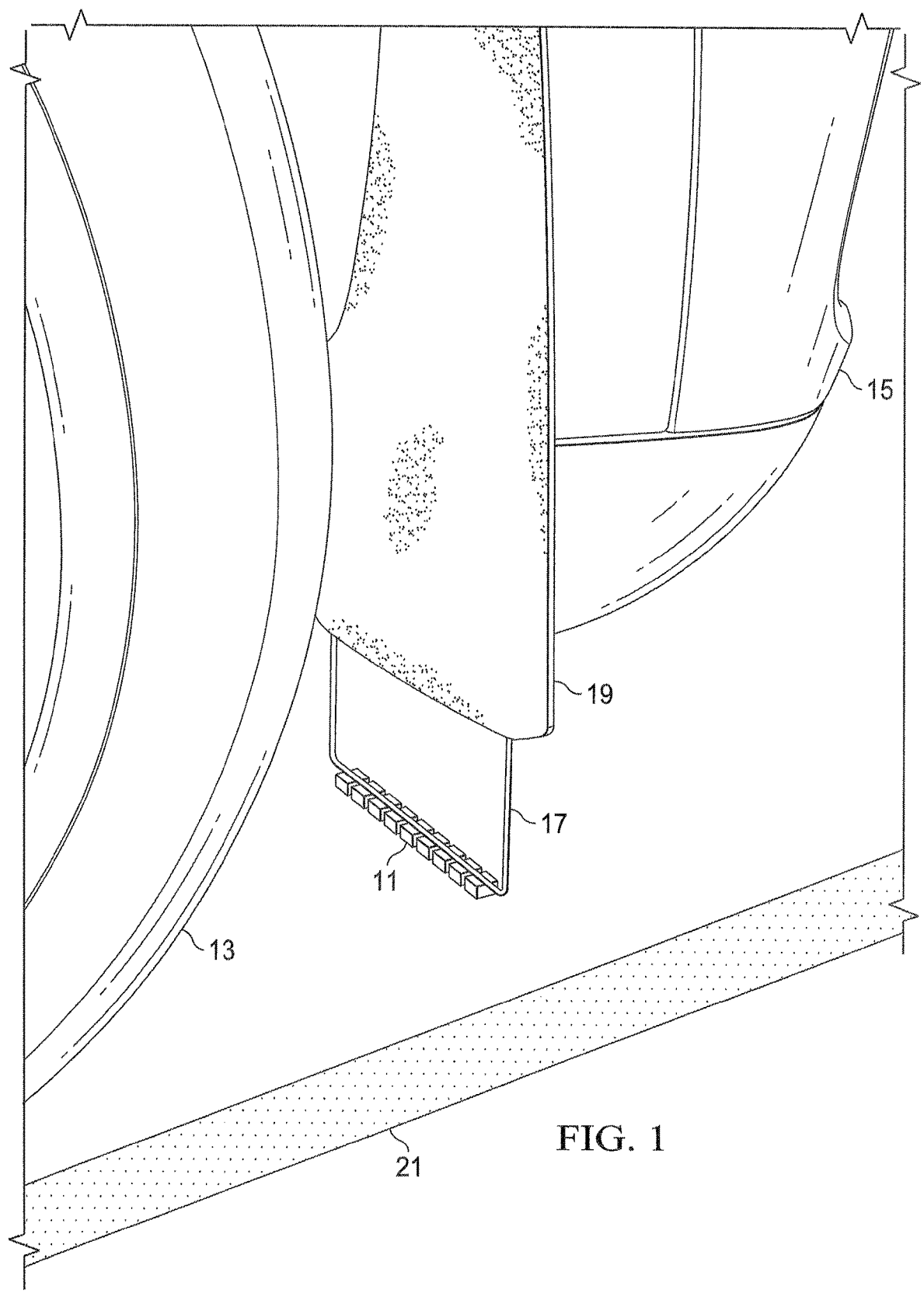
FIG. 1 is a perspective view from the front of a vehicle showing a preferred embodiment of the tire protection system of the present application installed on a vehicle.
Figure 2:
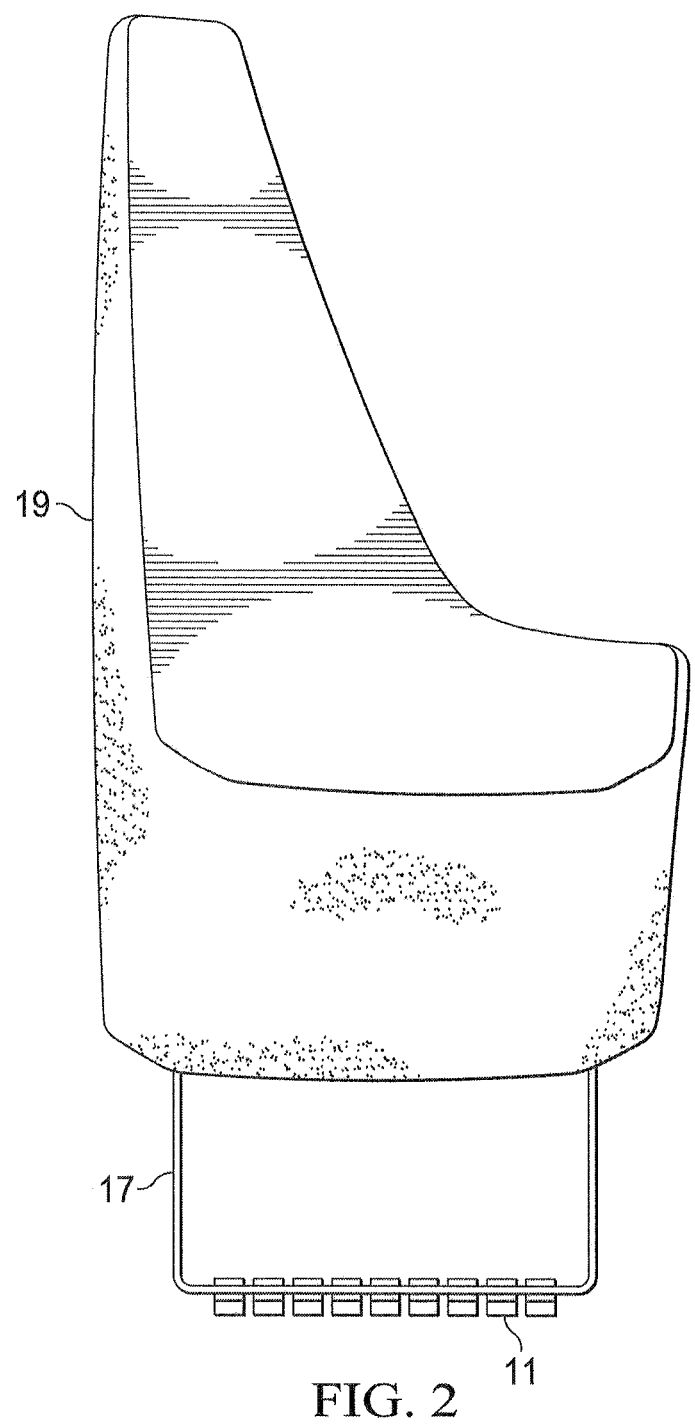
FIG. 2 is a perspective view of the tire protection system of FIG. 1.
Figure 3:
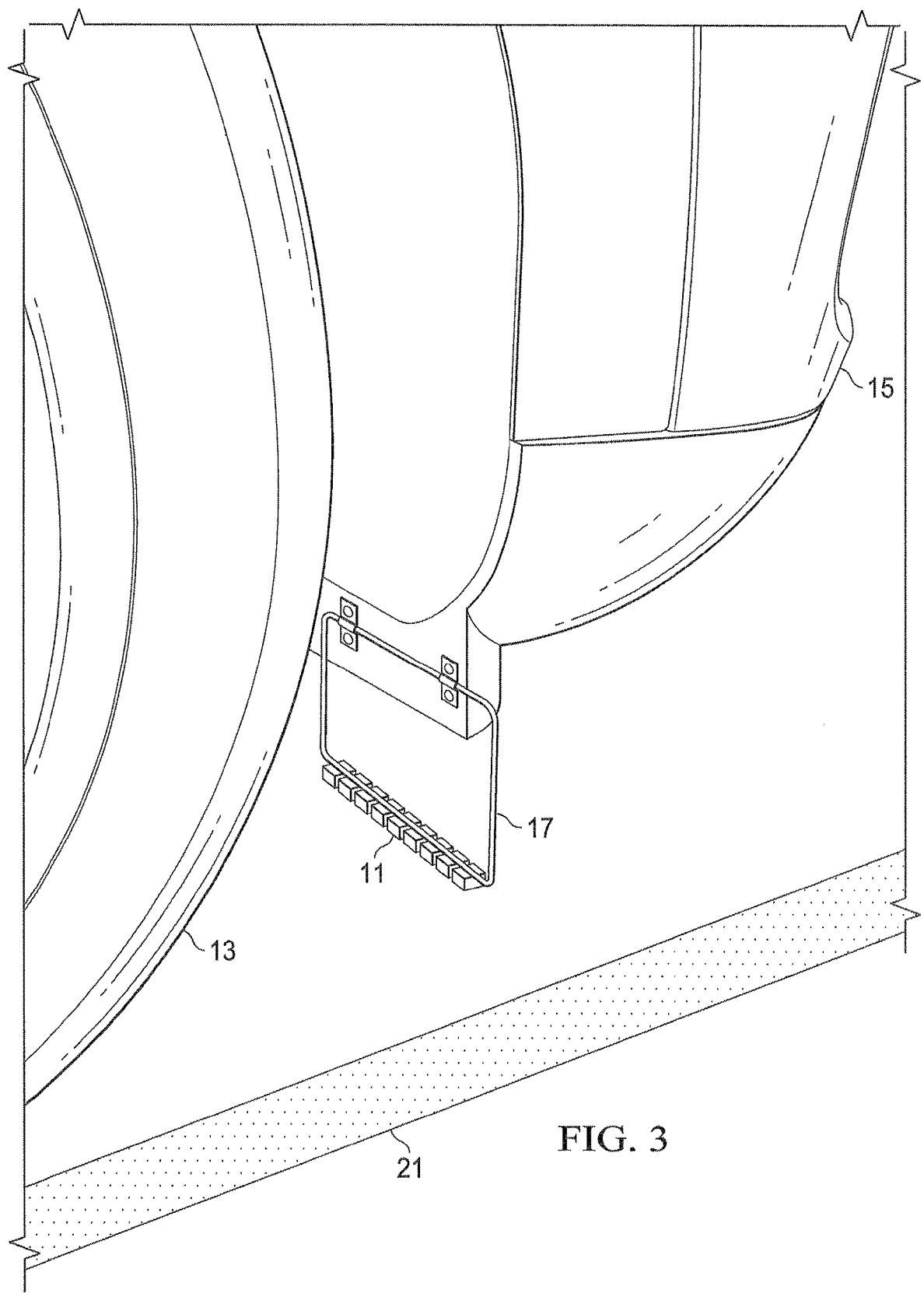
FIG. 3 is a perspective view of a retro-fit embodiment of the tire protection system of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the present application to the particular embodiment disclosed, but on the contrary, the intention is to cover all modifications, equivalents, alternatives, and combinations thereof, falling within the spirit and scope of the present application.

DETAILED DESCRIPTION OF THE PREFERRED EMBODIMENT

Referring to the Figures, a magnet assembly 11 is disposed in front of a tire 13 of a vehicle 15. In the preferred embodiment, magnet assembly 11 is integrated into a wire-type housing and/or frame 17 that is coupled to a mud flap, lower windscreen, body-side molding, wheel well, and/or fender 19 located near the undercarriage of vehicle 15. Magnet assembly 11 may be located in front of, behind, and both in front or and behind the wheels of vehicle 15.

Alternatively, magnet assembly 11 may be integrated into mud flap, lower wind screen, and/or body-side molding 19 of vehicle 15. In such embodiments, magnet assembly 11 may be formed of rubber, plastic, nylon, composite material, and/or various combinations thereof. It will be appreciated that magnet assembly 11 may be formed of multiple magnet assembly components, with the various magnet components having the same or dissimilar sizes, shapes, configurations, magnetic strengths, etc. as desired for different applications. For example, magnet assembly 11 for use on a construction vehicle would be larger and would likely require a stronger magnet than an assembly for a small passenger car.

Magnet assembly 11 may be in the form of a retro-fit assembly, or may be formed as part of an originally manufactured vehicle. In certain retro-fit embodiments, magnet assembly 11 may be adhered to, strapped to, screwed to, bolted to, fitted around, and/or other otherwise affixed to mud flap, lower wind screen, and/or body-side molding 19 of vehicle 15. In such embodiments, it is preferred that magnet assembly 11, be releasably attached to mud flap, lower wind screen, and/or body-side molding 19 of vehicle 15, so that magnet assembly 11 may be quickly and easily attached and detached therefrom.

Magnet assembly 11 functions to pick up ferrous materials, such as screws, nails, and other debris that might puncture or otherwise damage tire 13 as vehicle 15 travels along a driving surface 21. Driving surface 21 may be a paved roadway, an unpaved roadway, a gravel road, a dirt road, a trail, a construction site, etc.

In the preferred embodiment, magnet assembly 11 and frame 17 are fixed to mud flap 19 and are disposed in a fixed deployed position in which magnet assembly 11 is located near driving surface 21. As vehicle 15 travels along driving surface 21, magnet assembly 11 attracts and picks up metallic debris, thereby preventing the debris from damaging tire 13. The debris collects on magnet assembly 11 for later removal, either by the user, or by automated means.

The removal of the debris may be performed manually by the user, or automatically by selectively deactivating magnet assembly 11. The deactivation of magnet assembly 11 may be performed by physically separating the debris from magnet assembly 11, such as with the use of a screen or film that is moved away from magnet assembly 11, by electrically activating magnet assembly 11, or by other suitable means. The debris may either be removed onto the ground or into a reservoir for later disposal by the user.

In an alternative embodiment, magnet assembly 11 may include an actuation system, such that magnet assembly 11 may pivot, drop down, translate, or otherwise move from a retracted position in which magnet assembly 11 and/or frame 17 is located away from the driving surface to a deployed position in which magnet assembly 11 and/or frame 17 is located near driving surface 21. In the retracted position, magnet assembly 11 will likely not pick up any debris. The movement of magnet assembly 11 may be driven by electric, pneumatic, hydraulic, or other forms of motors and/or actuators, or various combinations thereof. Magnet assembly 11 may include one or more spacers, such as rollers, which maintain magnet assembly 11 a desired distance from driving surface while vehicle 15 travels along driving surface 21.

In another embodiment, magnet assembly 11 automatically moves between the retracted position and the deployed position in response to signals from sensors which detect the presence of debris. This embodiment includes a high-speed sensor and deployment system. This embodiment allows magnet assembly 11 to be hidden from view or otherwise stored in a position that does not detract from the appearance of vehicle 15. When debris is detected in front of or near tire 13, magnet assembly 11 is very quickly deployed to attract and collect the debris before the debris can damage tire 13. As soon as the debris is collected by magnet assembly 11, magnet assembly 11 is retracted back into the stored position.

In another embodiment, magnet assembly 11 is replaced or supplemented by an air blower assembly. The air blower assembly may be located underneath vehicle 15 and may be activated in the presence of debris in front of tire 13. Thus, air blower assembly may include various sensors to detect the presence of debris. It will be appreciated that in some embodiments, it may be desirable for the air blower assembly to operate continuously while vehicle 15 is in operation. With the air blower embodiments, it is preferred that the air blower assembly provide a burst of air to blow away any debris that is located in front of tire 13 as vehicle 15 travels along driving surface 21. Alternatively, the air blower assembly may operate continuously, but only at selected operational speeds.

In another embodiment, magnet assembly 11 is replaced or supplemented by a brush assembly. The brush assembly may be located underneath vehicle 15 and may be activated in the presence of debris in front of tire 13. The brush assembly would operate similarly to the air blower assembly. With the brush assembly embodiments, it is preferred that the brush assembly deploy or otherwise activate to brush away any debris that is located in front of tire 13 as vehicle 15 travels along driving surface 21. Alternatively, brush assembly may operate continuously at selected operational speeds.

Magnet assembly 11 may also include a control system having audio and/or video alarms, sensors, detectors, on-off switches, and/or gauges, to indicate the presence of debris and other operational parameters of magnet assembly 11, such as whether debris was collected by magnet assembly, or if the debris was missed. It will be appreciated that the control system may be located within vehicle 15, carried by magnet assembly 11, or both.

In those embodiments in which magnet assembly 11 requires a power source to function and/or operate, such power source may be a separate power source, such as a rechargeable battery, or may be the vehicle's power source.

Although magnet assembly 11 has been shown and described with respect to a passenger vehicle or a construction vehicle, it will be appreciated that the features of the present application may be applied to a vehicle designed solely for, or specifically for, picking up debris. For example, magnet assembly 11 may extend across the entire width of the vehicle, and/or beyond the width of the vehicle, as opposed to just in front of or behind the tires.

The system of the present application may be controlled by programmable software. The software may be stored and accessed via an app on a smart phone, tablet, and/or a computer system on the vehicle. The system may utilize a wired communication system or a wireless communication system. This allows data from the system to be collected, stored, transferred, and shared over various computer networks.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered, modified, and/or combined, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A tire protection system for use on a vehicle, the tire protection system comprising:
    a housing integral to a part of the vehicle, the vehicle having a tire;
    at least one magnet assembly coupled to the housing, the magnet assembly position being determined by the part of the vehicle and the tire, the part of the vehicle being selected and the magnet assembly integrated so as to attract debris as the vehicle travels.

* * * * *